(12) United States Patent
He et al.

(10) Patent No.: US 12,385,825 B2
(45) Date of Patent: Aug. 12, 2025

(54) **METHOD AND SYSTEM FOR DETECTING *FUSARIUM MONILIFORME* SPECIES OF RICE SEED**

(71) Applicant: Zhejiang University, Hangzhou (CN)

(72) Inventors: Yong He, Hangzhou (CN); Na Wu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 413 days.

(21) Appl. No.: 18/172,387

(22) Filed: Feb. 22, 2023

(65) Prior Publication Data

US 2023/0349817 A1 Nov. 2, 2023

(30) Foreign Application Priority Data

Apr. 28, 2022 (CN) .......................... 202210470718.1

(51) Int. Cl.
*G06T 7/90* (2017.01)
*G01N 21/25* (2006.01)
*G01N 21/64* (2006.01)

(52) U.S. Cl.
CPC ................ *G01N 21/25* (2013.01); *G06T 7/90* (2017.01); *G01N 2021/6423* (2013.01); *G01N 2333/37* (2013.01)

(58) Field of Classification Search
CPC ........... G06T 7/90; G06T 7/97; G06T 7/0004; G06T 2207/30128; G06T 2207/10036; G01N 21/25; G01N 2333/37

USPC ................................ 382/110, 156, 159, 207
See application file for complete search history.

(56) References Cited

U.S. PATENT DOCUMENTS

2025/0005942 A1* 1/2025 Panetta ................. G06T 7/0012

FOREIGN PATENT DOCUMENTS

CN 117132814 A * 11/2023

* cited by examiner

*Primary Examiner* — Jamares Q Washington
(74) *Attorney, Agent, or Firm* — McDonnell Bochnen Hulbert & Berghoff LLP (57) ABSTRACT

A method and system for detecting *Fusarium moniliforme* species of rice seeds are provided, relating to the field of rapid quality detection of rice seeds. The method includes: inputting a hyperspectral image of to-be-tested rice seeds to a model for detecting *Fusarium moniliforme* species of rice seed, to determine a test result of the rice seeds, where the test result is no *Fusarium moniliforme* or a *Fusarium* species. The model for detecting *Fusarium moniliforme* species of rice seed is determined based on activated wavelengths and an original deep convolutional neural network; the activated wavelengths are wavelengths activated by a trained deep convolutional neural network upon correct classification; and the trained deep convolutional neural network is a neural network obtained by training the original deep convolutional neural network based on the training set.

10 Claims, 5 Drawing Sheets

METHOD AND SYSTEM FOR DETECTING *FUSARIUM MONILIFORME* SPECIES OF RICE SEED

CROSS REFERENCE TO RELATED APPLICATION

This patent application claims the benefit and priority of Chinese Patent Application No. 202210470718.1 filed with the China National Intellectual Property Administration (CNIPA) on Apr. 28, 2022, the disclosure of which is incorporated by reference herein in its entirety as part of the present application.

FIELD

The present disclosure relates to the field of rapid quality detection of a rice seed, and in particular, to a method and system for detecting *Fusarium moniliforme* species of a rice seed.

BACKGROUND

Bakanae disease of rice is a common seed-borne disease in major rice producing areas of the world. When rice is infected with bakanae disease, the plant will show symptoms such as weakness, spindling, stunting, and low setting rate. In recent years, the incidence rate of bakanae disease in rice in China has been on the rise, which seriously endangers the safe production of rice in China. As a typical seed-borne disease, diseased rice seeds are the main source of infestation of rice bakanae disease. The sowing of diseased rice seeds can cause field diseases during the whole growth and development period of rice, thus reducing the yield and quality of rice. In addition, with the large-scale distribution of rice seeds in modern agricultural production, pathogenic bacteria can spread through rice seeds to disease-free areas, increasing the risk of bakanae disease spreading. Therefore, the detection of *Fusarium moniliforme* of rice seeds is important for the prevention and cure of bakanae disease in rice, to ensure the safe production of rice.

At present, the detection of pathogens of rice seeds is mainly carried out by professionals through sampling survey. The methods used include a visual inspection method, a washing inspection method, a staining test method, an agar plate method, etc. Plant pathologists also use molecular biology techniques for more accurate detection of pathogenic bacteria. However, these methods require specialized knowledge of plant protection and complex procedures, and can only be performed on a small sample of rice seeds. There is an urgent need for a rapid and accurate method for detection of pathogenic bacteria in large-scale rice seeds in the modern seed industry.

The hyperspectral imaging technology has the advantage of batch detection and is an effective tool for rapid quality detection of rice seeds in modern seed industry. Some researchers have applied the hyperspectral imaging technology to the detection of pathogens in seeds of maize, rice, watermelon and the like. However, most of the researches have been focused on the differentiation of healthy and bacterial rice seeds, without identifying different pathogenic bacteria. In fact, *Fusarium moniliforme* includes many different subspecies, among which *F. andiyazi, F. fujikuroi, F. proliferatum*, and *F. verticillioides* are the four *Fusarium moniliforme* species that frequently infect rice in China. In addition, due to the high sparsity and redundancy of the hyperspectral image, data dimensionality reduction is a routine step in the analysis of hyperspectral image data, which is usually implemented by adding a wavelength selection algorithm before the classification decision maker. However, the wavelength selection algorithm and the classification decision maker often cannot be tuned simultaneously to achieve the global optimum, which affects the overall performance of the model. Therefore, it is necessary to develop a method that can quickly and accurately detect the major *Fusarium moniliforme* of rice seeds.

SUMMARY

In view of this, an objective of the present disclosure is to provide a method and system for detecting *Fusarium moniliforme* species of rice seed, to detect *Fusarium moniliforme* species in the rice seeds quickly and accurately.

To achieve the above objective, the present disclosure provides the following technical solutions.

According to a first aspect, the present disclosure provides a method for detecting *Fusarium moniliforme* species of rice seeds, including:
  obtaining a hyperspectral image of a to-be-tested rice seed; and
  inputting the hyperspectral image of the to-be-tested rice seed to a model for detecting *Fusarium moniliforme* of rice seed, to determine a test result of the rice seed, where the test result is no *Fusarium moniliforme* or a *Fusarium moniliforme* species,
  where the model for detecting *Fusarium moniliforme* species of rice seed is determined based on activated wavelengths and an original deep convolutional neural network;
  the original deep convolutional neural network includes a plurality of convolutional layers; a data set includes a plurality of samples, and each of the samples includes input data and a class; the input data is an average spectrum of the rice seed, and the class is no *Fusarium moniliforme* or a *Fusarium moniliforme* species; the data set is divided into a training set and a test set; and
  the activated wavelengths are wavelengths activated by a trained deep convolutional neural network upon correct classification; and the trained deep convolutional neural network is a neural network obtained by training the original deep convolutional neural network based on the training set.

In some embodiments, the inputting the hyperspectral image of the to-be-tested rice seed to a model for detecting *Fusarium moniliforme* species of rice seed, to determine a test result of the rice seed specifically includes:
  inputting a processed hyperspectral image to the model for detecting *Fusarium moniliforme* species of rice seed to determine the test result of the rice seed, where the processed hyperspectral image is a hyperspectral image of the to-be-tested rice seed on which preprocessing operations have been performed,
  where the preprocessing operations include black/white calibration, rice seed region division, pixel spectrum extraction, head and tail band removal, and seed region pixel spectrum averaging in sequence.

In some embodiments, a process of determining the data set includes:
  acquiring a hyperspectral image of sample rice seeds;
  performing preprocessing operations on the hyperspectral image of the sample rice seeds, to obtain an average spectrum of each of the sample rice seeds, where the preprocessing operations include black/white calibration, rice seed region division, pixel spectrum extraction, head and tail band removal, and seed region pixel spectrum averaging in sequence; and constructing a data set based on the average spectrum of each of the sample rice seeds.

In some embodiments, a preparation process of the sample rice seeds includes:

disinfecting and cleaning pathogen-free rice seeds;

performing enrichment culture on *Fusarium moniliforme* of different species, to obtain spore suspensions corresponding to the *Fusarium moniliforme* of different species;

grouping the disinfected and cleaned rice seeds, placing one group of disinfected and cleaned rice seeds in sterile water, and placing remaining groups of disinfected and cleaned rice seeds in different types of spore suspensions, where in the remaining groups of disinfected and cleaned rice seeds, one group of disinfected and cleaned rice seeds corresponds to one type of spore suspension, and different groups of disinfected and cleaned rice seeds correspond to different types of spore suspensions; and taking out and drying the rice seeds immersed in the sterile water and the rice seeds immersed in the spore suspensions, to form the sample rice seeds.

In some embodiments, the original deep convolutional neural network includes a first convolutional block, a first max pooling layer, a second convolutional block, a second max pooling layer, a flattening layer, a first fully connected layer, and a second fully connected layer that are sequentially connected, where the first convolutional block and the second convolutional block each include a first convolutional sub-block and a second convolutional sub-block that are sequentially connected; the first convolutional sub-block and the second convolutional sub-block each include a convolutional layer and a processing layer that are sequentially connected; and the processing layer includes an activation function and a batch normalization operation.

In some embodiments, a process of determining the activated wavelengths includes:

obtaining a target sample, where the target sample is a sample which is correctly classified in a test phase, and the test phase is a phase in which the trained deep convolutional neural network is evaluated by using the test set;

when the target sample is an input of the trained deep convolutional neural network, calculating a gradient of an output of the trained deep convolutional neural network with respect to all feature maps of a last convolutional layer;

calculating a weight of each of the feature maps based on the gradient;

performing linear weighting on all the feature maps based on the weight of each of the feature maps, to obtain a heat map;

setting negative values of the heat map to 0, to obtain a heat map for discrimination of each class;

expanding, by using a nearest neighbor interpolation algorithm, the heat map for discrimination of each class;

sorting indexes of bands in descending order of heat values in the expanded heat map; and determining activated wavelengths corresponding to each class according to the sorted bands, where the activated wavelengths corresponding to the class are top N bands of the sorted bands.

In some embodiments, a process of determining the model for detecting *Fusarium moniliforme* species of rice seed includes:

performing dimensionality reduction on the data set by using the activated wavelengths; and training and testing the original deep convolutional neural network by using the data set after the dimensionality reduction, to obtain the model for detecting *Fusarium moniliforme* species of rice seed.

According to a second aspect, the present disclosure provides a system for detecting *Fusarium moniliforme* species of rice seed, including:

a module for obtaining hyperspectral image of a to-be-tested rice seed, configured to obtain the hyperspectral image of the to-be-tested rice seed; and a test result determining module, configured to input the hyperspectral image of the to-be-tested rice seed to a model for detecting *Fusarium moniliforme* species of rice seed, to determine a test result of the rice seeds, where the test result is no *Fusarium moniliforme* or a *Fusarium moniliforme* species, where the model for detecting *Fusarium moniliforme* species of rice seed is determined based on activated wavelengths and an original deep convolutional neural network;

the original deep convolutional neural network includes a plurality of convolutional layers; a data set includes a plurality of samples, and each of the samples includes input data and a class; the input data is an average spectrum of the rice seeds, and the class is no *Fusarium moniliforme* or a *Fusarium moniliforme* species; the data set is divided into a training set and a test set; and the activated wavelengths are wavelengths activated by a trained deep convolutional neural network upon correct classification; and the trained deep convolutional neural network is a neural network obtained by training the original deep convolutional neural network by using based on the training set.

In some embodiments, the system further includes: an activated wavelength determining module, which is configured to:

obtain a target sample, where the target sample is a sample which is correctly classified in a test phase, and the test phase is a phase in which the trained deep convolutional neural network is evaluated by using the test set;

when the target sample is an input of the trained deep convolutional neural network, calculate a gradient of an output of the trained deep convolutional neural network with respect to all feature maps of a last convolutional layer;

calculate a weight of each of the feature maps based on the gradient;

perform linear weighting on all the feature maps based on the weight of each of the feature maps, to obtain a heat map;

set negative values of the heat map to 0, to obtain a heat map for discrimination of each class;

expand, by using a nearest neighbor interpolation algorithm, the heat map for discrimination of each class;

sort indexes of bands in descending order of heat values in the expanded heat map; and determine activated wavelengths corresponding to each class according to the sorted bands, where the activated wavelengths corresponding to the class are top N bands of the sorted bands.

In some embodiments, the system further includes: a rice-seed-*Fusarium-moniliforme*-species-detection-model determining module, which is configured to:

perform dimensionality reduction on the data set by using the activated wavelengths; and train and test the original deep convolutional neural network by using the data set after the dimensionality reduction, to obtain the model for detecting *Fusarium moniliforme* species of rice seed.

According to the specific embodiments provided by the present disclosure, the present disclosure discloses the following technical effects:

The present disclosure provides a method and system for detecting *Fusarium moniliforme* species of rice seeds. In the present disclosure, a special deep convolutional neural network model is constructed based on the activated wavelengths, a rapid and accurate detection of different *Fusarium moniliforme* species of rice seed is implemented. The present disclosure can help quickly reveal pathogenic bacteria carried by rice seeds, and provide technical support to cut off the source of rice diseases and protect rice food security in time.

Moreover, the present disclosure can provide a reference for further development of multispectral instruments for online quality detection of rice seeds.

BRIEF DESCRIPTION OF THE DRAWINGS

To describe the embodiments of the present disclosure or the technical solutions in the related art more clearly, the accompanying drawings required in the embodiments are briefly introduced below. Apparently, the accompanying drawings described below are only some embodiments of the present disclosure. A person of ordinary skill in the art may further obtain other accompanying drawings based on these accompanying drawings without creative labor.

DETAILED DESCRIPTION

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and system for detecting *Fusarium moniliforme* species of a rice seed, to detect *Fusarium moniliforme* species of the rice seed quickly and accurately.

To make the above-mentioned objective, features, and advantages of the present disclosure clearer and more comprehensible, the present disclosure will be further described in detail below in conjunction with the accompanying drawings and specific embodiments.

Figure 1:
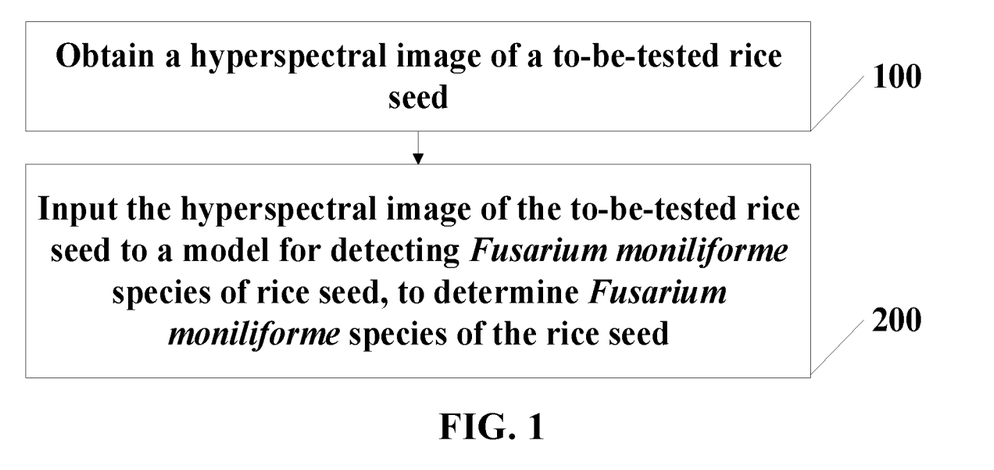
FIG. 1 is a flowchart of a method for detecting *Fusarium moniliforme* species of a rice seed according to the present disclosure.
Figure 2:
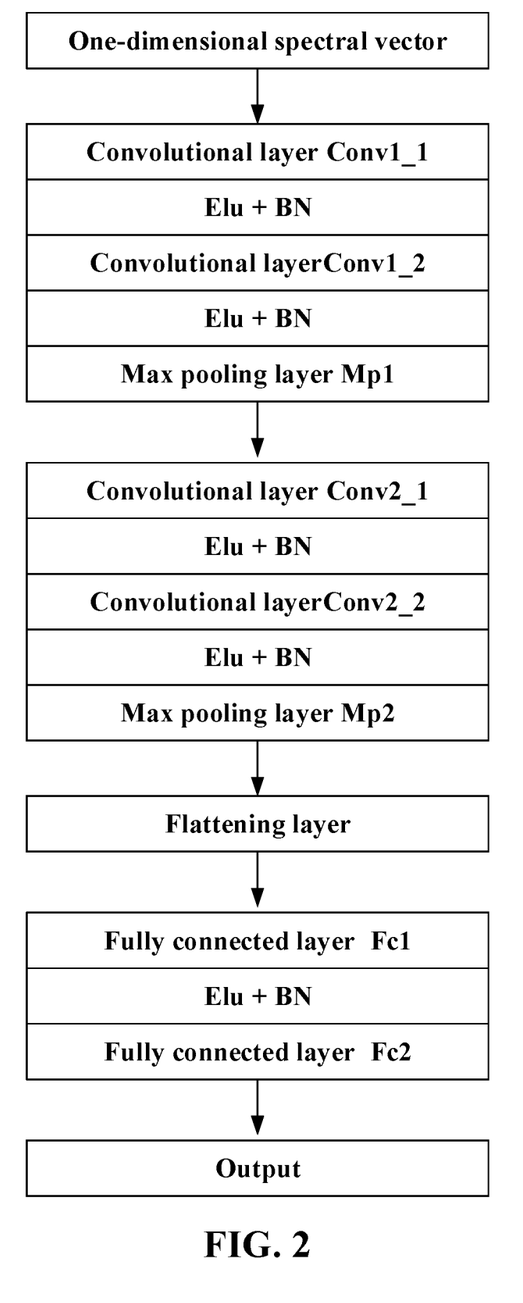
FIG. 2 is an architecture diagram of an original deep convolutional neural network according to an embodiment of the present disclosure.
Figure 3:
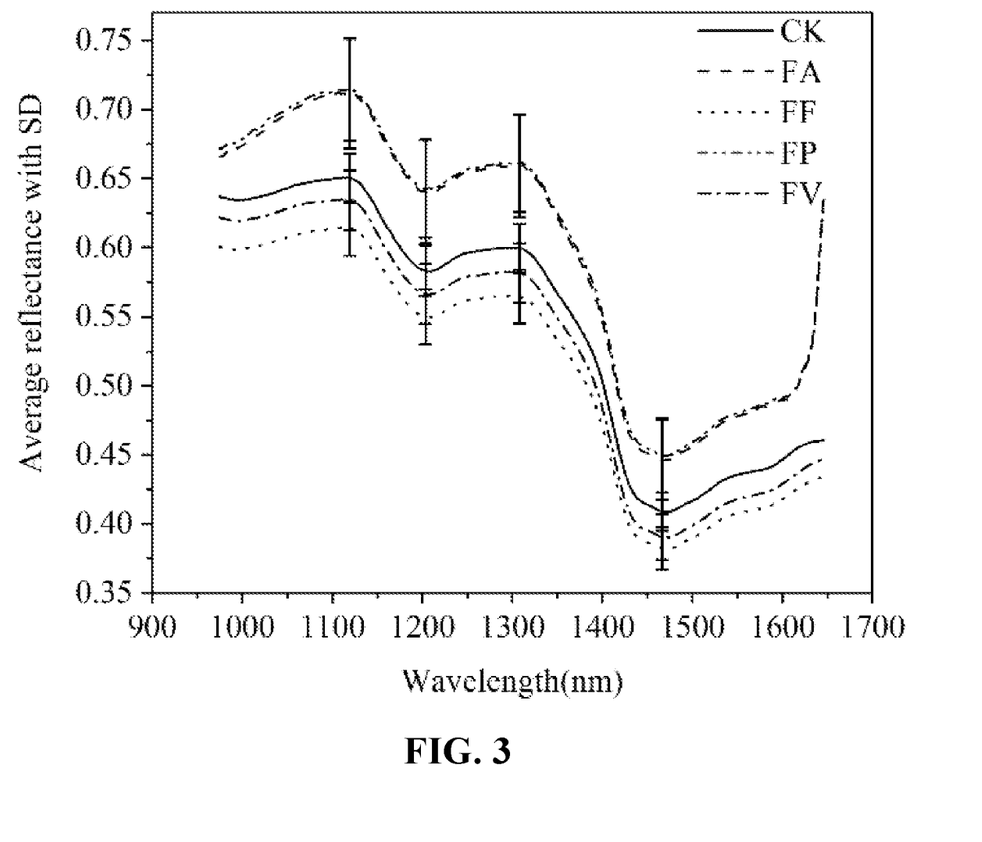
FIG. 3 is a diagram of average spectral curves of rice seeds carrying different pathogenic bacteria according to an embodiment of the present disclosure.
Figure 4:
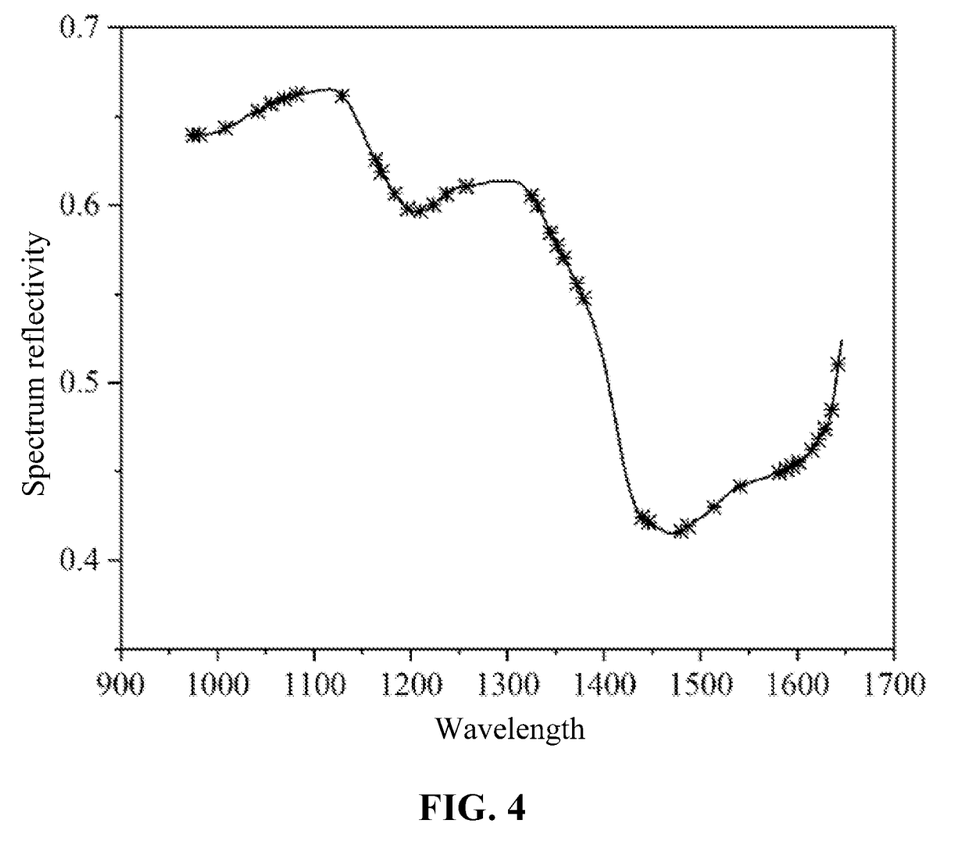
FIG. 4 is a schematic diagram of wavelengths activated by a trained deep convolutional neural network for a classification task of rice seeds carrying different pathogenic bacteria according to an embodiment of the present disclosure.

FIG. 1 is a flowchart of a method for detecting *Fusarium moniliforme* species of a rice seed according to the present disclosure. As shown in FIG. 1, the method for detecting *Fusarium moniliforme* species of a rice seed according to an embodiment of the present disclosure includes the following steps.

In step 100, a hyperspectral image of a to-be-tested rice seed is obtained.

In step 200, the hyperspectral image of the to-be-tested rice seed is inputted to a model for detecting *Fusarium moniliforme* species of rice seed, to determine a test result of the rice seed, where the test result is no *Fusarium moniliforme* or a *Fusarium moniliforme* species.

The model for detecting *Fusarium moniliforme* species of the rice seed is determined based on activated wavelengths and an original deep convolutional neural network.

The original deep convolutional neural network includes a plurality of convolutional layers; a data set includes a plurality of samples, and each of the samples includes input data and a class; the input data is an average spectrum of the rice seed, and the class is no *Fusarium moniliforme* or a *Fusarium moniliforme* species; the data set is divided into a training set and a test set.

The activated wavelengths are wavelengths activated by a trained deep convolutional neural network (which is also known as a trained full-spectrum-based deep convolutional neural network) upon classifying correctly; and the trained deep convolutional neural network is a neural network obtained by training the original deep convolutional neural network based on the training set.

As a preferred implementation, step 100 in this embodiment of the present disclosure specifically includes:

inputting a processed hyperspectral image to the model for detecting *Fusarium moniliforme* species of the rice seed to determine the test result of the rice seed, where the processed hyperspectral image is a hyperspectral image of the to-be-tested rice seed on which preprocessing operations have been performed.

The preprocessing operations include black/white calibration, rice seed region division, pixel spectrum extraction, head and tail band removal, and seed region pixel spectrum averaging in sequence.

As a preferred implementation, a process of determining the data set in this embodiment of the present disclosure includes the following steps.

In step 1, hyperspectral images of sample rice seeds are acquired.

Specifically, a near-infrared scanning hyperspectral imaging system with a wavelength range of 874 to 1734 nm and a spectral resolution of 5 nm is used to image sample rice seeds.

In Step 2, preprocessing operations are performed on the hyperspectral images of the sample rice seeds, to obtain an average spectrum of each of the sample rice seeds, where the preprocessing operations include black/white calibration, rice seed region division, pixel spectrum extraction, head and tail band removal, and seed region pixel spectrum averaging in sequence.

Specifically, the acquired hyperspectral images of the sample rice seeds are first subjected to black/white calibration, and then threshold segmentation is performed on the calibrated hyperspectral image to obtain a rice seed region. Pixel spectral information in the rice seed region is extracted, and head and tail bands are removed. All remaining pixel spectra are averaged, and an average spectrum is used as a representation of a single rice seed.

In Step 3, a data set is constructed based on the average spectrum of each sample rice seed.

The spectra of all rice seeds are divided into a training set and a test set based on a certain ratio, for subsequent modeling.

Further, a preparation process of the sample rice seeds is as follows:

First, pathogen-free rice seeds are disinfected and cleaned.

In an example, full and healthy rice seeds are selected, and the rice seeds are disinfected and cleaned with 1% sodium hypochlorite solution.

Then, enrichment culture is performed on *Fusarium moniliforme* of different species, to obtain spore suspensions corresponding to the *Fusarium moniliforme* of different species.

In an example, *Fusarium moniliforme* of different species are subjected to enrichment culture on a potato dextrose agar (PDA) culture medium; after specified requirements are satisfied, spore suspensions corresponding to *Fusarium moniliforme* of different species are prepared with sterile distilled water.

Next, the disinfected and cleaned rice seeds are grouped, one group of disinfected and cleaned rice seeds is placed in sterile water, and remaining groups of disinfected and cleaned rice seeds are placed in different types of spore suspensions, where in the remaining groups of disinfected and cleaned rice seeds, one group of disinfected and cleaned rice seeds corresponds to one type of spore suspension, and different groups of disinfected and cleaned rice seeds correspond to different types of spore suspensions.

In an example, the disinfected and cleaned rice seeds are divided into several groups, and then placed into different sterile petri dishes. One group of rice seeds is added with sterile water until the rice seeds are submerged, and other groups are added with equal amounts of different types of spore suspensions.

Finally, the rice seeds immersed in the sterile water and the rice seeds immersed in the spore suspensions are taken out and dried, to form the sample rice seeds.

In an example, the rice seeds are soaked in bacterial solutions or sterile water for 24 hours and then taken out and naturally dried in a fume hood for use.

As a preferred embodiment, the original deep convolutional neural network in this embodiment of the present disclosure is a one-dimensional deep convolutional neural network constructed according to spectral characteristics of the rice seeds. The network is trained by using the training set, and model performance is evaluated by using the test set.

The original deep convolutional neural network mainly includes a first convolutional block, a first max pooling layer, a second convolutional block, a second max pooling layer, a flattening layer, a first fully connected layer, and a second fully connected layer that are sequentially connected.

As shown in FIG. 2, the first convolutional block and the second convolutional block each include a first convolutional sub-block and a second convolutional sub-block that are sequentially connected; the first convolutional sub-block and the second convolutional sub-block each include a convolutional layer and a processing layer that are sequentially connected; and the processing layer includes an activation function and a batch normalization (BN) operation. A processing layer is also provided between the first fully connected layer and the second fully connected layer.

In the field of machine vision, many researchers have tried to explain a decision mechanism of the neural network through visualization approaches. It has been found that when a two-dimensional deep convolutional neural network is used to perform an image classification task, the network has different regions of interest in images for different classes. In view of this, the inventors believe that, in the field of spectral analysis, the one-dimensional deep convolutional neural network has different wavelengths of interest for different classes during the classification task. Bands activated by the network upon classifying correctly are the factor for the network to make the correct decision, while the other bands may have less relevance or negative relevance to the network decision. Therefore, the present disclosure proposes a spectral gradient weighting method for obtaining spectral wavelengths activated by the deep network in the task of detecting major *Fusarium moniliforme* species of the rice seed.

On this basis, a process of determining the activated wavelengths in this embodiment of the present disclosure is as follows.

First, a target sample is obtained, where the target sample is a sample correctly classified in a test phase, and the test phase is a phase in which the trained deep convolutional neural network is evaluated by using the test set.

Further, when the target sample is an input of the trained deep convolutional neural network, a gradient of an output of the trained deep convolutional neural network with respect to all feature maps of a last convolutional layer is calculated.

Then, a weight of each feature map is calculated based on the gradient, and linear weighting is performed on all feature maps based on the weight of each feature map, to obtain a heat map.

Summation and averaging is performed on each feature map based on the gradient, and a resulting average value is used as the weight of the feature map.

Next, negative values of the heat map are set to 0, to obtain a heat map for discrimination of each of the classes; the heat map for discrimination of each of the classes is expanded by using a nearest neighbor interpolation algorithm, to make the size of the heat map equal to that of the originally inputted spectrum.

Finally, indexes of bands are sorted in descending order of heat values in the expanded heat map; and an activated wavelength corresponding to each of the classes is determined according to the sorted bands, where the activated wavelengths corresponding to each class are top N bands of the sorted bands.

In an example, the spectral bands are sorted in descending order of the heat values in the heat map, and top N bands are labeled as "Top-N activated wavelengths". The Top-N activated wavelengths of all classes are merged to serve as the wavelengths that the convolutional neural network focuses on when making a decision.

As a preferred implementation, a process of determining the model for detecting *Fusarium moniliforme* species of a rice seed according to this embodiment of the present disclosure is as follows:

performing dimensionality reduction on the data set by using the activated wavelengths; and training and testing the original deep convolutional neural network by using the data set after the dimensionality reduction, to obtain the model for detecting *Fusarium moniliforme* species of the rice seed.

The following is a further illustration of the model for detecting *Fusarium moniliforme* species of the rice seed through Yongyou No. 9 rice seeds.

In Step 1, rice seeds carrying pathogens are prepared.

Taking YongYou No. 9 as an example, full and healthy rice seeds are first selected; then the rice seeds are soaked with 1% sodium hypochlorite for 15 minutes and rinsed with sterile water for three times. This process is repeated for five times to disinfect and clean the rice seeds.

Four species of *Fusarium moniliforme* are purchased and inoculated onto a PDA medium for enrichment culture, and when the colonies grow to ½ of the medium size, the colonies are submerged in sterile distilled water and spore suspensions are harvested with mycelial filter cotton. The concentration of each spore suspension is adjusted to $1\times10^7$ spores/ml by adding sterile distilled water.

The sterile rice seeds are divided into 5 groups; 4 groups of which are put into 4 sterile petri dishes respectively, and spore suspensions with different *Fusarium moniliforme* species are added until the rice seeds are submerged. The fifth group of rice seeds is added with an equal amount of sterile water to serve as a control group. The groups are coded as CK, FA, FF, FP and FV according to the inocula.

The rice seeds are soaked in the *Fusarium moniliforme* spore suspensions or sterile water for 24 hours and then dried in a fume hood for use.

In Step 2, hyperspectral images of the rice seeds are acquired.

A line-scan near-infrared hyperspectral imaging system is used to image the different groups of rice seeds mentioned above. The system mainly includes an ImSpector N17E imaging spectrometer and a Xeva 922 charge coupled device (CCD) camera. The system has a wavelength range of 874 to 1734 nm and a spectral resolution of 5 nm.

Through adjustment, the speed of the conveyor belt for moving the rice seeds, the distance from the rice seeds to the camera lens, and the exposure intensity of the system light source are set to 11 mm/s, 9 cm, and 3 ms, respectively during the acquisition of the rice seed image.

In Step 3, hyperspectral image data are preprocessed.

The acquired hyperspectral images are first calibrated by using a whiteboard image with a reflectivity close to 100% and a blackboard image with a reflectivity close to 0.

Then a rice seed region in the calibrated image is obtained by using a simple threshold segmentation algorithm.

Spectral information of all pixels in a region of a single rice seed is extracted. The head and tail bands of the spectral curve are removed to remove systematic noise, while the remaining 200 bands (975 to 1646 nm) are retained. The retained pixel spectra are averaged and a resulting average spectrum is used as the representation of the rice seed. A diagram of the specific average curve is shown in FIG. 3.

A total of 5120 spectrum samples of rice seed are obtained, with 1024 samples in each group. Rice seeds in each group are divided into a training sub-set and a test sub-set based on a ratio of 4:1, and the five groups are combined to obtain a final training set and test set.

In Step 4, a deep network model is constructed and evaluated.

Based on the spectral characteristics of rice seeds, a one-dimensional deep convolutional neural network is constructed, and the basic structure of the network structure is shown in FIG. 2. The deep convolutional neural network includes four one-dimensional convolutional layers, which are used to automatically extract potential disease representations in the spectrum of the rice seed. The number of feature maps in the convolutional layers (from deep to shallow) is 16, 16, 32, and 32, and all convolutional kernels have a size of 1×3. Each convolutional layer is followed by an activation function (ELU) and a batch normalization operation (Batch Normalization) to mitigate the data offset and accelerate convergence of the model. Every two convolutional layers are followed by a max pooling layer, where the second maximum pooling layer is followed by a flattening layer, which is used to unfold a depth spectral feature into a one-dimensional form. The deep convolutional neural network ends with two fully-connected layers, which contain 64 neurons and 5 neurons, respectively, for classifying rice seeds carrying *Fusarium moniliforme* of different species.

The deep convolutional neural network uses cross-entropy as a loss function, and an adaptive moment estimation (Adam) optimizer is used to update parameters during network training, and a learning rate thereof is optimally set to 0.0001. After iterative adjustment, the number of samples (batch) inputted to the network at one time is set to 64 and the number of network iterations (epoch) is set to 600. The one-dimensional deep convolutional neural network is trained by using the training set, and the performance of the trained network is evaluated by using the test set.

After the above operations, the deep convolutional neural network achieves an accuracy of 99% in the classification task of different *Fusarium moniliforme* species of the rice seed, and the F-scores of CK, FA, FF, FP and FV groups are 99.51%, 99.51%, 98.31%, 99.51% and 98.28%, respectively.

In Step 5, activated wavelengths are acquired.

By finding the wavelengths activated by the trained deep convolutional neural network upon correct classification, it is possible to understand the decision mechanism of the deep convolutional neural network and develop a simpler model and a more economical multispectral instrument for the quality detection of rice seeds. For the classification task of different *Fusarium moniliforme* species of rice seeds, a spectral gradient weighting method is used.

Specifically, for class c (c=CK, FA, FF, FP, FV), a sample which is correctly classified in terms of the class is retrieved from the test set, and a gradient of an output of the trained deep convolutional neural network in step 4 (with the retrieved sample as an input) relative to all 32 feature maps of the last convolutional layer is calculated. Then, summation and averaging is performed on each feature map based on the gradient, and a resulting average value is the weight of the feature map. Linear weighting is performed on the 32 feature maps to obtain a heat map of 1×100. Negative values in the heat map are set to 0, to obtain a region that is useful for discrimination of class c. Then, the heat map is expanded to the size 1×200 of the original input spectrum by using the nearest neighbor interpolation algorithm.

Based on the heat values in the heat map, i.e., the weight of each band, the indexes of the bands are sorted in descending order and the top 10 bands are selected. The 10 bands are the bands that the deep network focuses on when determining whether a sample belongs to class c. The 10 bands are labeled as "Top-10 activated wavelengths". The activated wavelengths based on the classification task are shown in FIG. 4.

Respective Top-10 activated wavelengths corresponding to the five classes are obtained and merged, to obtain 38 activated wavelengths finally, which are:

975 nm, 982 nm, 1009 nm, 1042 nm, 1056 nm, 1069 nm, 1082 nm, 1130 nm, 1164 nm, 1170 nm, 1183 nm, 1197 nm, 1210 nm, 1224 nm, 1237 nm, 1257 nm, 1325 nm, 1332 nm, 1345 nm, 1352 nm, 1359 nm, 1372 nm, 1379 nm, 1440 nm, 1446 nm, 1480 nm, 1487 nm, 1514 nm, 1541 nm, 1582 nm, 1588 nm, 1595 nm, 1602 nm, 1615 nm, 1622 nm, 1629 nm, 1636 nm, and 1642 nm.

In Step 6, a simplified model is constructed based on the activated wavelengths.

Based on the activated wavelengths of the deep network obtained in step 5, the training set and test set after dimensionality reduction are obtained. The one-dimensional deep convolutional neural network in step 4 is reused and trained based on the training set after the dimensionality reduction. The network achieves accuracy of 97.76% on the test set after the dimensionality reduction, with F-scores of 100%, 98.77%, 95.73%, 98.79% and 95.48% for the five groups, i.e., CK, FA, FF, FP and FV, respectively.

Figure 5:
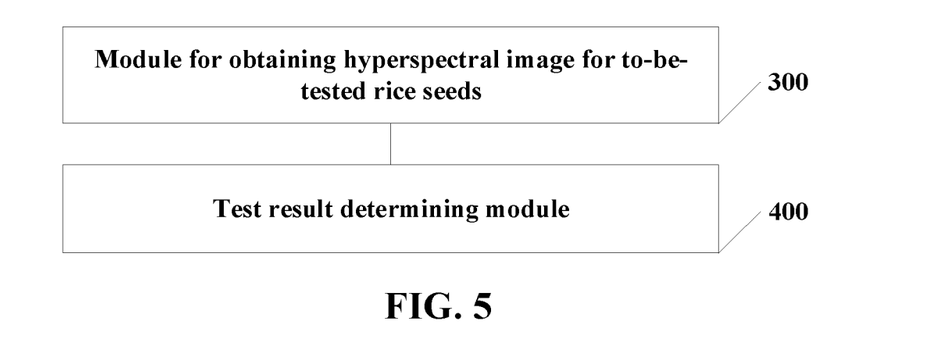
FIG. 5 is a structural diagram of a system for detecting *Fusarium moniliforme* species of a rice seed according to the present disclosure.

To achieve the foregoing objective, an embodiment of the present disclosure further provides a system for detecting *Fusarium moniliforme* species of rice seed as shown in FIG. 5, including:

a module 300 for obtaining hyperspectral image of a to-be-tested rice seed, configured to obtain the hyperspectral image of the to-be-tested rice seed; and a test result determining module 400, configured to input the hyperspectral image of the to-be-tested rice seed to a model for detecting *Fusarium moniliforme* species of rice seed, to determine a test result of the rice seeds, where the test result is no *Fusarium moniliforme* or a *Fusarium moniliforme* species.

The model for detecting *Fusarium moniliforme* species of rice seed is determined based on activated wavelengths and an original deep convolutional neural network. The original deep convolutional neural network includes a plurality of convolutional layers; a data set includes a plurality of samples, and each of the samples includes input data and a class; the input data is an average spectrum of the rice seeds, and the class is no *Fusarium moniliforme* or a *Fusarium moniliforme* species. The data set is divided into a training set and a test set. The activated wavelengths are wavelengths activated by a trained deep convolutional neural network upon correct classification; and the trained deep convolutional neural network is a neural network obtained by training the original deep convolutional neural network based on the training set.

Further, this embodiment further includes: an activated wavelength determining module, which is configured to:

obtain a target sample, where the target sample is a sample which is correctly classified in a test phase, and the test phase is a phase in which the trained deep convolutional neural network is evaluated by using the test set;

when the target sample is an input of the trained deep convolutional neural network, calculate a gradient of an output of the trained deep convolutional neural network with respect to all feature maps of a last convolutional layer;

calculate a weight of each of the feature maps based on the gradient;

perform linear weighting on all the feature maps based on the weight of each of the feature maps, to obtain a heat map;

set negative values of the heat map to 0, to obtain a heat map for discrimination of each class;

expand, by using a nearest neighbor interpolation algorithm, the heat map for discrimination of each class;

sort indexes of bands in descending order of heat values in the expanded heat map; and determine activated wavelengths corresponding to each class according to the sorted bands, where the activated wavelengths corresponding to the class are top N bands of the sorted bands.

In some embodiments, this embodiment further includes: a rice-seed-*Fusarium-moniliforme*-species-detection-model determining module, which is configured to:

perform dimensionality reduction on the data set by using the activated wavelengths; and train and test the original deep convolutional neural network by using the data set after the dimensionality reduction, to obtain the model for detecting *Fusarium moniliforme* species of rice seed.

Each embodiment of the present specification is described in a progressive manner, each example focuses on the difference from other examples, and the same and similar parts between the examples may refer to each other. Since the system disclosed in an embodiment corresponds to the method disclosed in another embodiment, the description is relatively simple, and reference can be made to the method description.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A method for detecting *Fusarium moniliforme* species of rice seed, comprising:

obtaining a hyperspectral image of a to-be-tested rice seed; and inputting the hyperspectral image of the to-be-tested rice seed to a model for detecting *Fusarium moniliforme* species of rice seed, to determine a test result of the rice seed, wherein the test result is selected from a group consisting of no *Fusarium moniliforme* and a *Fusarium moniliforme* species;

wherein the model for detecting *Fusarium moniliforme* species of rice seed is determined based on activated wavelengths and an original deep convolutional neural network;

the original deep convolutional neural network comprises a plurality of convolutional layers; a data set comprises a plurality of samples, and each of the samples comprises input data and a class; the input data is an average spectrum of the rice seed, and the class is selected from a group consisting of no *Fusarium moniliforme* and a *Fusarium moniliforme* species; the data set is divided into a training set and a test set; and the activated wavelengths are wavelengths activated by a trained deep convolutional neural network upon correct classification; and the trained deep convolutional neural network is a neural network obtained by training the original deep convolutional neural network based on the training set.

2. The method according to claim 1, wherein the inputting the hyperspectral image of the to-be-tested rice seed to a model for detecting *Fusarium moniliforme* of rice seed, to determine a test result of the rice seed comprises:

inputting a processed hyperspectral image to the model for detecting *Fusarium moniliforme* species of rice seed to determine the test result of the rice seed, wherein the processed hyperspectral image is a hyperspectral image of the to-be-tested rice seed on which preprocessing operations have been performed, wherein the preprocessing operations comprise black/white calibration, rice seed region division, pixel spectrum extraction, head and tail band removal, and seed region pixel spectrum averaging in sequence.

3. The method according to claim 1, wherein a process of determining the data set comprises:

acquiring a hyperspectral image of sample rice seeds;

performing preprocessing operations on the hyperspectral image of the sample rice seeds, to obtain an average spectrum of each of the sample rice seeds, wherein the preprocessing operations comprise black/white calibration, rice seed region division, pixel spectrum extraction, head and tail band removal, and seed region pixel spectrum averaging in sequence; and constructing the data set based on the average spectrum of each of the sample rice seeds.

4. The method according to claim 3, wherein a preparation process of the sample rice seeds comprises:

disinfecting and cleaning pathogen-free rice seeds;

performing enrichment culture on *Fusarium moniliforme* of different species, to obtain spore suspensions corresponding to the *Fusarium moniliforme* of different species;

grouping the disinfected and cleaned rice seeds, placing one group of disinfected and cleaned rice seeds in sterile water, and placing remaining groups of disinfected and cleaned rice seeds in different types of spore suspensions, wherein in the remaining groups of disinfected and cleaned rice seeds, one group of disinfected and cleaned rice seeds corresponds to one type of spore suspension, and different groups of disinfected and cleaned rice seeds correspond to different types of spore suspensions; and taking out and drying the rice seeds immersed in the sterile water and the rice seeds immersed in the spore suspensions, to form the sample rice seeds.

5. The method according to claim 1, wherein the original deep convolutional neural network comprises a first convolutional block, a first max pooling layer, a second convolutional block, a second max pooling layer, a flattening layer, a first fully connected layer, and a second fully connected layer that are sequentially connected, wherein the first convolutional block and the second convolutional block each comprise a first convolutional sub-block and a second convolutional sub-block that are sequentially connected; the first convolutional sub-block and the second convolutional sub-block each comprise a convolutional layer and a processing layer that are sequentially connected; and the processing layer comprises an activation function and a batch normalization operation.

6. The method according to claim 1, wherein a process of determining the activated wavelengths comprises:

obtaining a target sample, wherein the target sample is a sample which is correctly classified in a test phase, and the test phase is a phase in which the trained deep convolutional neural network is evaluated by using the test set;

when the target sample is an input of the trained deep convolutional neural network, calculating a gradient of an output of the trained deep convolutional neural network with respect to all feature maps of a last convolutional layer;

calculating a weight of each of the feature maps based on the gradient;

performing linear weighting on all the feature maps based on the weight of each of the feature maps, to obtain a heat map;

setting negative values of the heat map to 0, to obtain a heat map for discrimination of each class;

expanding, by using a nearest neighbor interpolation algorithm, the heat map for discrimination of each class;

sorting indexes of bands in descending order of heat values in the expanded heat map; and determining activated wavelengths corresponding to each class according to the sorted bands, wherein the activated wavelengths corresponding to the class are top N bands of the sorted bands.

7. The method according to claim 1, wherein a process of determining the model for detecting *Fusarium moniliforme* species of rice seed comprises:

performing dimensionality reduction on the data set by using the activated wavelengths; and training and testing the original deep convolutional neural network by using the data set after the dimensionality reduction, to obtain the model for detecting *Fusarium moniliforme* species of rice seed.

8. A system for detecting *Fusarium moniliforme* species of rice seed, comprising:

a module for obtaining a hyperspectral image of a to-be-tested rice seed, configured to obtain the hyperspectral image of the to-be-tested rice seed; and a test result determining module, configured to input the hyperspectral image of the to-be-tested rice seed to a model for detecting *Fusarium moniliforme* species of rice seed, to determine a test result of the rice seeds, wherein the test result is selected from a group consisting of no *Fusarium moniliforme* and a *Fusarium moniliforme* species;

wherein the model for detecting *Fusarium moniliforme* species of rice seed is determined based on activated wavelengths and an original deep convolutional neural network;

the original deep convolutional neural network comprises a plurality of convolutional layers; a data set comprises a plurality of samples, and each of the samples comprises input data and a class; the input data is an average spectrum of the rice seeds, and the class is selected from a group consisting of no *Fusarium moniliforme* and a *Fusarium moniliforme* species; the data set is divided into a training set and a test set; and the activated wavelengths are wavelengths activated by a trained deep convolutional neural network upon correct classification; and the trained deep convolutional neural network is a neural network obtained by training the original deep convolutional neural network based on the training set.

9. The system according to claim 8, further comprising: an activated wavelength determining module, configured to:

obtain a target sample, wherein the target sample is a sample which is correctly classified in a test phase, and the test phase is a phase in which the trained deep convolutional neural network is evaluated by using the test set;

when the target sample is an input of the trained deep convolutional neural network, calculate a gradient of an output of the trained deep convolutional neural network with respect to all feature maps of a last convolutional layer;

calculate a weight of each of the feature maps based on the gradient;

perform linear weighting on all the feature maps based on the weight of each of the feature maps, to obtain a heat map;

set negative values of the heat map to 0, to obtain a heat map for discrimination of each class;

expand, by using a nearest neighbor interpolation algorithm, the heat map for discrimination of each class;

sort indexes of bands in descending order of heat values in the expanded heat map; and determine activated wavelengths corresponding to each class according to the sorted bands, wherein the activated wavelengths corresponding to the class are top N bands of the sorted bands.

10. The system according to claim 8, further comprising:
a rice-seed-*Fusarium-moniliforme*-species-detection-model determining module, configured to:

perform dimensionality reduction on the data set by using the activated wavelengths; and train and test the original deep convolutional neural network by using the data set after the dimensionality reduction, to obtain the model for detecting *Fusarium moniliforme* species of rice seed.

\* \* \* \* \*